(12) United States Patent
Akiyama (10) Patent No.: US 9,285,667 B2
(45) Date of Patent: Mar. 15, 2016

(54) PROJECTOR

(75) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 72 days.

(21) Appl. No.: 14/001,295

(22) PCT Filed: Feb. 2, 2012

(86) PCT No.: PCT/JP2012/000705
§ 371 (c)(1),
(2), (4) Date: Aug. 23, 2013

(87) PCT Pub. No.: WO2012/124249
PCT Pub. Date: Sep. 20, 2012

(65) Prior Publication Data
US 2013/0335709 A1    Dec. 19, 2013

(30) Foreign Application Priority Data

Mar. 11, 2011 (JP) ................................. 2011-054022

(51) Int. Cl.
*G03B 21/20* (2006.01)
*G02B 27/09* (2006.01)
(Continued)

(52) U.S. Cl.
CPC ........ *G03B 21/2073* (2013.01); *G02B 27/0927* (2013.01); *G02B 27/285* (2013.01); *G03B 21/204* (2013.01); *G03B 21/208* (2013.01); *H04N 9/315* (2013.01); *H04N 9/3173* (2013.01); *G02B 27/286* (2013.01); *G02B 2207/113* (2013.01); *H04N 9/3167* (2013.01)

(58) Field of Classification Search
CPC ............. G03B 21/204; G03B 21/2066; G03B 21/208; H04N 9/315; H04N 9/3164; H04N 9/3167; H04N 9/3152; F21V 11/08; F21V 11/10; F21V 11/12
USPC ...................................................... 353/98, 99
See application file for complete search history.

(56) References Cited

U.S. PATENT DOCUMENTS

| 5,309,340 A | 5/1994 | Shigeta et al. |
| 2002/0176255 A1 | 11/2002 | Yamauchi et al. |

(Continued)

FOREIGN PATENT DOCUMENTS

| CA | 2002909 | 6/1990 |
| CN | 101918877 A | 12/2010 |

(Continued)

OTHER PUBLICATIONS

International Search Report issued in International Patent Application No. PCT/JP2012/000705 dated Jul. 27, 2012.

(Continued)

*Primary Examiner* — William C Dowling
*Assistant Examiner* — Ryan Howard (57) ABSTRACT

A projector including a light source apparatus that includes a fluorescent layer that produces fluorescence by irradiation of an excitation light emitted from a solid-state light source, a polarization conversion element that converts the light from the light source apparatus into polarized light, and a reflector that is disposed between the light source apparatus and the polarization conversion element, transmits light in the vicinity of the optical axis of the light source apparatus, and reflects peripheral light apart from the optical axis of the light source apparatus toward the fluorescent layer.

15 Claims, 7 Drawing Sheets

(51) Int. Cl.
*H04N 9/31* (2006.01)
*G02B 27/28* (2006.01)

(56) References Cited

U.S. PATENT DOCUMENTS

| | | |
|---|---|---|
| 2006/0227302 A1 | 10/2006 | Harbers et al. |
| 2010/0045937 A1 | 2/2010 | Li |
| 2010/0091247 A1 | 4/2010 | Yamamoto |
| 2010/0290008 A1* | 11/2010 | Suga et al. .................. 353/20 |

FOREIGN PATENT DOCUMENTS

| | | |
|---|---|---|
| EP | 0 373 822 A2 | 6/1990 |
| EP | 1 566 847 A1 | 8/2005 |
| JP | H11-223798 A | 8/1999 |
| JP | 2005-208571 A | 8/2005 |
| JP | 2006-018195 A | 1/2006 |
| JP | 2007-193119 A | 8/2007 |
| JP | 2009-192724 A | 8/2009 |
| JP | A-2010-91927 | 4/2010 |

OTHER PUBLICATIONS

Written Opinion of the International Searching Authority issued in International Patent Application No. PCT/JP2012/000705 dated Jul. 27, 2012.

* cited by examiner

PROJECTOR

BACKGROUND

1. Technical Field

The present invention relates to a projector.

2. Related Art

There is a known projector of related art including an illuminator including a light source apparatus that outputs parallelized light, a reflective light modulator that modulates the light from the illuminator in accordance with image information, and a projection system that projects the light from the light modulator (see, Patent Literature 1, for example). The projector of related art can project an image according to image information by using the light from the illuminator (see, e.g., JP-A-2010-91927).

As a light source apparatus in a projector, it is widely known to use a light source apparatus including a solid-state light source that produces excitation light and a fluorescent layer that produces fluorescence when excited with the excitation light. Since a light source apparatus of this type can be compact and lightweight and output high-luminance light considering its size, a projector using the thus configured light source apparatus can be compact and lightweight and output high-luminance light considering its size as well. Such a projector is suitably used as an ultra-compact projector (what is called pico-projector), for example, used alone or incorporated in another apparatus.

In a technical field of projectors, it is always required to increase the light usage efficiency. In particular, in an ultra-compact projector, increasing the light usage efficiency is particularly important because problems resulting from being ultra-compact (it is difficult to provide an enough space, for example) make it difficult to increase the luminance.

SUMMARY

An advantage of some aspects of the invention is to provide a projector capable of further increasing the light usage efficiency.

A projector according to an aspect of the invention includes an illuminator including a light source apparatus that includes the following components and outputs parallelized light: a solid-state light source that produces excitation light, a fluorescent layer that produces fluorescence from a part of the excitation light emitted from the solid-state light source, and a collimator system that parallelizes a light from the fluorescent layer; a light modulator that modulates a light from the illuminator in accordance with image information; and a projection system that projects a light from the light modulator. The illuminator further includes a polarization conversion element that converts a light from the light source apparatus into a polarized light and a reflector that is disposed between the light source apparatus and the polarization conversion element, transmits light in the vicinity of an optical axis of the light source apparatus, and reflects peripheral light apart from the optical axis of the light source apparatus toward the fluorescent layer.

The projector according to the aspect of the invention includes a reflector that is disposed between the light source apparatus and the polarization conversion element. The reflector transmits light in the vicinity of the optical axis of the light source apparatus and reflects peripheral light apart from the optical axis of the light source apparatus toward the fluorescent layer. Therefore, excitation light contained in the peripheral light returns to the fluorescent layer. Consequently, an extra amount of fluorescence can be emitted from the fluorescent layer by irradiation of the excitation light. As a result, the light usage efficiency can be further increased.

Since peripheral light is not used to project a projection image in many cases from the viewpoint of the quality of the light (such as the degree of parallelism), the configuration according to the aspect of the invention does not reduce the light usage efficiency in the projector as a whole.

Since the projector according to the aspect of the invention includes a light source apparatus including a solid-state light source that produces excitation light and a fluorescent layer that produces fluorescence by irradiation of the excitation light, the projector can be compact and lightweight and emit high-luminance light considering its size.

The "parallelized light" used herein is not limited only to parallelized light in an exact sense but includes light considered to be practically parallelized light. Further, the "parallelize" used herein is not limited only to parallelizing the entire light in an exact sense but includes producing light that can be handled as practically parallelized light.

The reflector may be set apart from the polarization conversion element or may be set in contact with the polarization conversion element. The reflector may, for example, be a reflection mirror. Alternatively, a reflection layer may be directly formed on the light-incident surface of the polarization conversion element in an evaporation process, and the reflection layer may be used as the reflector.

In the projector according to the aspect of the invention, the reflector preferably has a light transmitting section including the optical axis of the light source apparatus and a light reflecting section having a reflection mirror that surrounds the light transmitting section.

The configuration described above, which is a simple configuration, allows the peripheral light to be reflected. Further, changing the shape of the light transmitting section allows adjustment of the outer shape of the light incident on an optical element in a downstream stage.

As the reflector described above, for example, four stripe-shaped reflection mirrors can be provided as the light reflecting section and arranged around the optical axis (see FIG. 5, which will be described later). In this case, the portion surrounded by the four reflection mirrors forms the light transmitting section. Alternatively, a single reflection mirror having an internal space (for example, window-frame-shaped mirror or donut-shaped mirror) can be provided as the light reflecting section and so disposed that the optical axis passes through the internal space (see FIG. 8, which will be described later). In this case, the space in the reflection mirror directly forms the light transmitting section.

In the projector according to the aspect of the invention, the light transmitting section preferably has a rectangular shape. The rectangular shape preferably has a center that coincides with the optical axis of the illuminator. The rectangular shape preferably has a diagonal length ranging from 70% of an effective diameter of the collimator system to 110% thereof.

According to the configuration described above, since the diagonal length of the rectangular shape ranges from 70% of the effective diameter of the collimator system to 110% thereof, the light in the vicinity of the optical axis will not be reflected, whereas the peripheral light can be sufficiently reflected.

The reason why the diagonal length of the rectangular shape falls within the range described above is that when the length is shorter than 70%, the light in the vicinity of the optical axis is also disadvantageously reflected in some cases, whereas when the length is longer than 110%, the peripheral light cannot be sufficiently reflected in some cases.

From the viewpoint described above, the diagonal length of the rectangular shape more preferably ranges from 80% of the effective diameter of the collimator system to 105% thereof, and still more preferably ranges from 85% of the effective diameter of the collimator system to 100% thereof.

In the projector according to the aspect of the invention, the light transmitting section has a rectangular shape having a center that coincides with the optical axis of the illuminator. In this case, when the light transmitting section is used with an optical element having a rectangular area within which incident light can be used (rectangular polarization conversion element and integrator rod having rectangular column shape, for example), an optical element in a downstream stage can be used in the most effective manner because the light transmitting section and the area described above of the optical element have the same shape.

The center of the rectangular shape does not necessarily coincide with the optical axis of the illuminator in an exact sense but may substantially coincide therewith. Further, the rectangular shape includes a square shape.

The "effective diameter of the collimator system" refers to the diameter of a light flux from the collimator system when viewed from a plane perpendicular to the optical axis of the illuminator.

In the projector according to the aspect of the invention, the collimator system is preferably formed of at least two collimator lenses, and at least one surface among surfaces of the at least two collimator lenses is preferably an aspheric surface.

The configuration described above allows the light from the fluorescent layer to be parallelized with precision.

The configuration described above further allows the aspheric surface to adjust the light flux density distribution of the parallelized light.

In the projector according to the aspect of the invention, the collimator system preferably outputs light having a substantially uniform light flux density distribution.

The configuration described above allows a sufficiently uniform in-plane light intensity distribution to be provided without an optical integration system or any other similar optical system, whereby the resultant projector can be more compact and lightweight.

The collimator system described above can, for example, be configured to have two aspheric surfaces, the upstream aspheric surface substantially homogenizing the light flux density distribution and the downstream aspheric surface parallelizing the light.

In the projector according to the aspect of the invention, the light modulator is preferably a single transmissive light modulator.

The configuration described above allows the optical system to be simplified, unlike a case where a reflective light modulator is used or a case where a plurality of light modulators are provided. As a result, the projector can be still more compact and lightweight.

The word "transmissive" used herein means that the light modulator is of light-transmitting type, such as transmissive liquid crystal light modulator, and the word "reflective" used herein means that the light modulator is of light-reflecting type, such as a reflective liquid crystal light modulator.

In the projector according to the aspect of the invention, the light modulator preferably has a color filter.

The configuration described above allows a color projection image can be projected by using only one light modulator.

In the projector according to the aspect of the invention, the color filter is preferably formed of reflective dichroic filters.

The configuration described above allows color light that is not desired to be transmitted in a color separation process to be reflected, whereby the color light, which may overheat the light modulator, will not be absorbed.

The configuration described above further allows part of the excitation light having reached the color filter to be reflected, whereby the light usage efficiency can be further increased by allowing the reflected excitation light to be incident again on the fluorescent layer.

In the projector according to the aspect of the invention, the color filter is preferably formed of color filters disposed in a Bayer arrangement.

The configuration described above allows a projected image to be of apparently high resolution.

The configuration described above allows the number of dichroic filters that transmit green light through the color filter and reflect blue light to be greater than the number of other color filters, whereby the blue light, which is used as excitation light in many cases, is allowed to be reflected more and return to the fluorescent layer.

In the projector according to the aspect of the invention, an optical system ranging from the solid-state light source to the projection system is preferably arranged along a straight line when the optical system is viewed in at least one direction among directions perpendicular to the optical axis of the illuminator.

The configuration described above allows the projector to have a simple configuration.

The projector according to the aspect of the invention may be so configured that the optical system ranging from the solid-state light source to the projection system is arranged along a straight line when the optical system is viewed in any of the directions perpendicular to the optical axis of the illuminator.

In the projector according to the aspect of the invention, the light source apparatus preferably includes a white-light emitting diode formed of the solid-state light source and the fluorescent layer.

A white-light emitting diode is of high luminance and high reliability and can produce light (red light, green light, and blue light) that can be used as white light, whereby the configuration described above allows a reliable, high-luminance, full-color image to be projected.

The "white-light emitting diode" used herein refers to a device that includes a solid-state light source formed of a light emitting diode that produces blue light and a fluorescent layer that produces fluorescence containing red light and green light from part of the blue light so that the device outputs blue light having passed through the fluorescent layer along with the fluorescence.

DESCRIPTION OF AN EXEMPLARY EMBODIMENT

A projector according to an embodiment of the invention will be described below with reference to an embodiment shown in the drawings.

Embodiment

Figure 1:
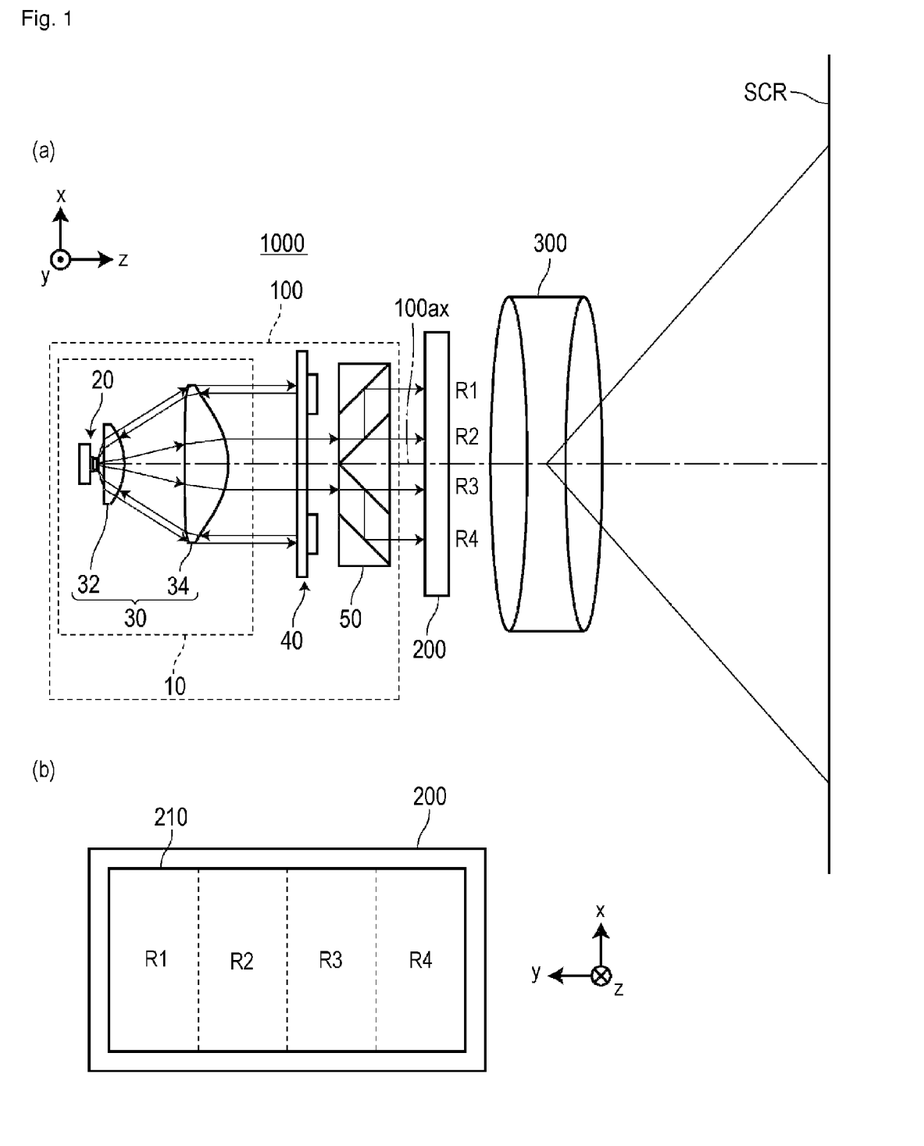
FIG. 1 describes a projector according to an embodiment.

FIG. 1 describes a projector 1000 according to the embodiment. FIG. 1(a) is a plan view showing an optical system of the projector 1000, and FIG. 1(b) shows a liquid crystal light modulator 200 viewed from the side where an illuminator 100 is present. In FIG. 1(a), the arrows drawn between a white-light emitting diode 20 and the liquid crystal light modulator 200 roughly indicate how light travels byway of example. Reference characters R1, R2, R3, and R4 represent four divided areas of an image formation area 210.

Figure 2:
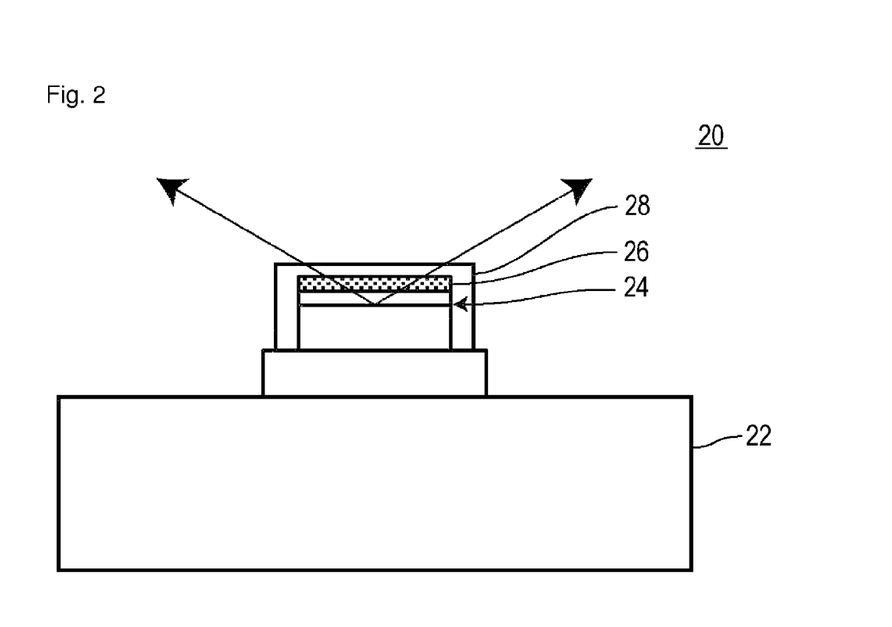
FIG. 2 is an enlarged cross-sectional view of a white-light emitting diode in the embodiment.

FIG. 2 is an enlarged cross-sectional view of the white-light emitting diode 20 in the embodiment.

Figure 3:
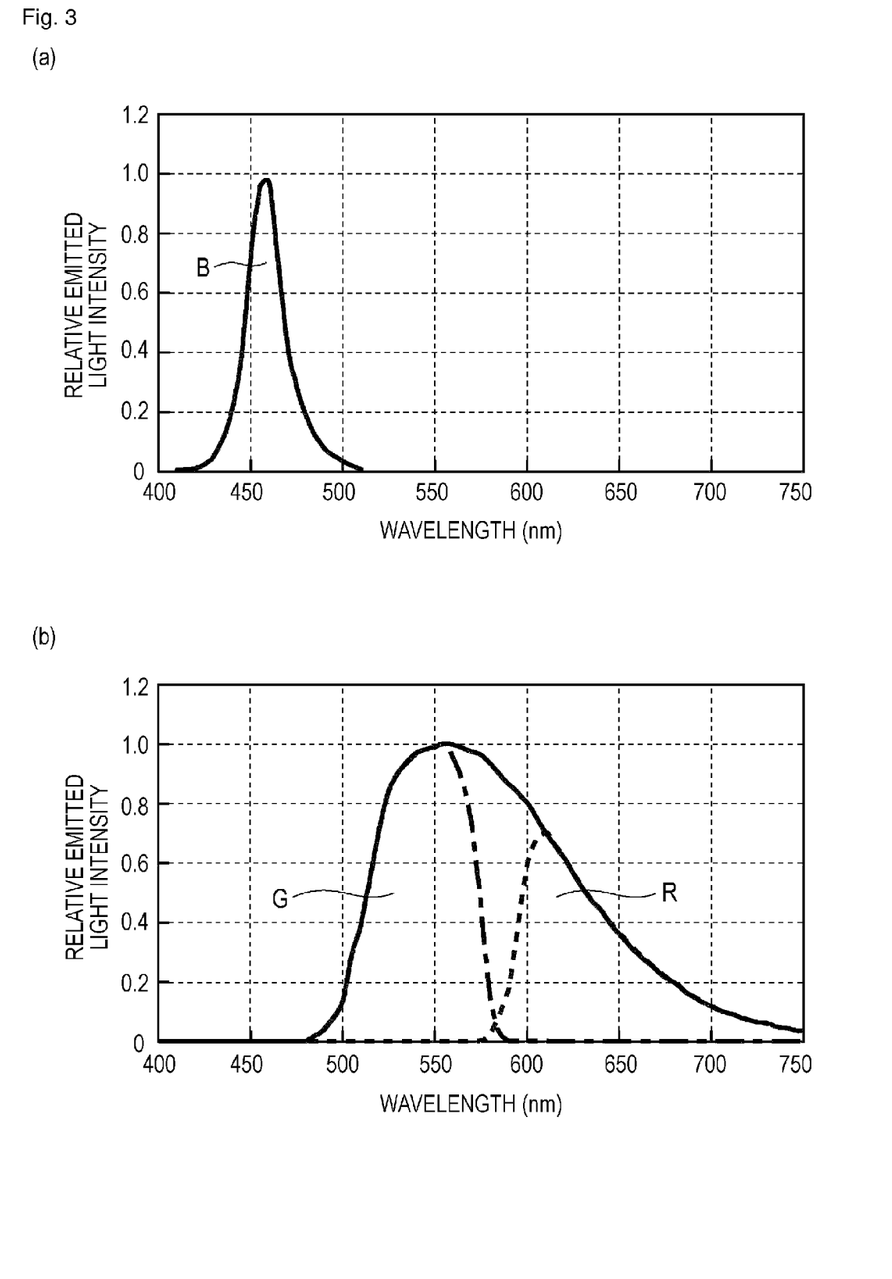
FIG. 3 shows graphs illustrating an emitted light intensity characteristic of a solid-state light source and an emitted light intensity characteristic of a phosphor in the embodiment.

FIG. 3 shows graphs illustrating an emitted light intensity characteristic of a solid-state light source 24 and an emitted light intensity characteristic of a phosphor in the embodiment. The graph shown in FIG. 3(a) illustrates the emitted light intensity characteristic of the solid-state light source 24, and the graph shown in FIG. 3(b) illustrates the emitted light intensity characteristic of a phosphor contained in a fluorescent layer 26. The emitted light intensity characteristic used herein presents the relationship between the intensity of emitted light and the wavelength of the emitted light produced when a voltage is applied to a light source or excitation light is incident on a phosphor. The vertical axis in FIG. 3 represents relative emitted light intensity, and the emitted light intensity at a wavelength where it is maximized is normalized to one. The horizontal axis in FIG. 3 represents the wavelength.

Figure 4:
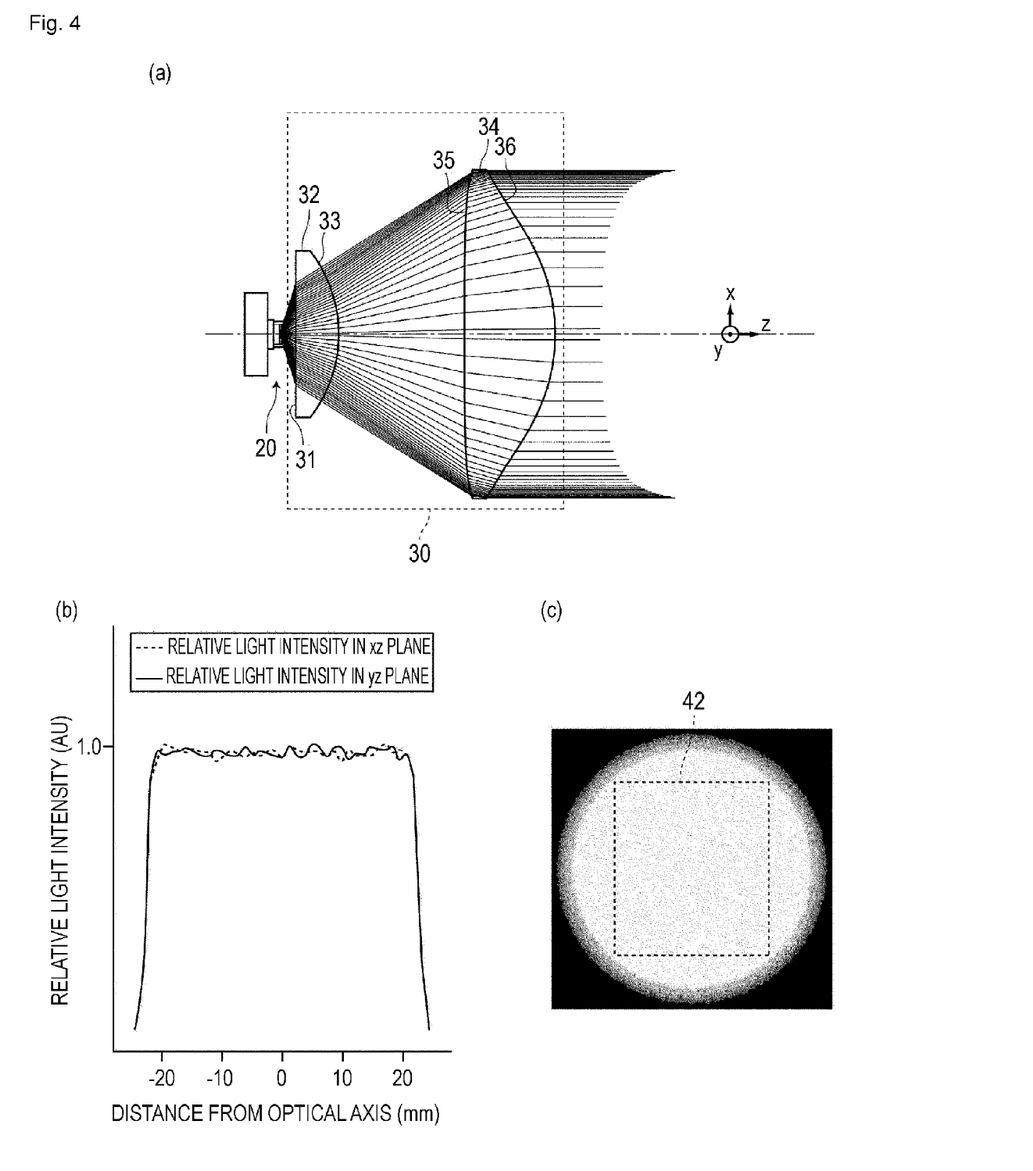
FIG. 4 describes a light source apparatus in the embodiment.

FIG. 4 describes a light source apparatus 10 in the embodiment. FIG. 4(a) shows how the light emitted from the white-light emitting diode 20 is parallelized by a collimator system 30. FIG. 4(b) shows graphs illustrating relative light intensity (relative light flux intensity) of the light that exits from the collimator system 30. FIG. 4(c) shows the relative light intensity (relative light flux intensity) of the light that exits from the collimator system 30. It is noted that the light rays shown in FIG. 4(a) represent how the light emitted from the white-light emitting diode 20 is parallelized by the collimator system 30 but do not represent the light flux density. The vertical axis in FIG. 4(b) represents the relative light intensity of the light that exits from the collimator system 30, and the intensity of the light traveling along the optical axis is normalized to one. The horizontal axis in FIG. 4(b) represents the distance from the optical axis. In FIG. 4(c), the broken-line rectangle represents the shape of a light transmitting section 42.

Figure 5:
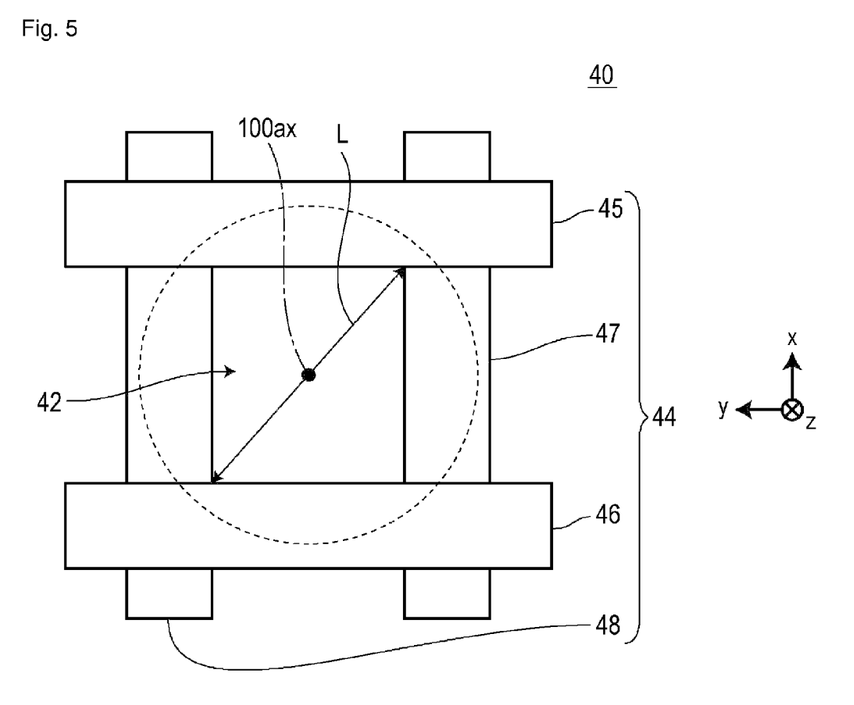
FIG. 5 shows a reflector in the embodiment viewed from the side where a collimator system is present.

FIG. 5 shows a reflector 40 in the embodiment viewed from the side where the collimator system 30 is present. The broken-line circle in FIG. 5 represents an effective diameter of the collimator system 30.

Figure 6:
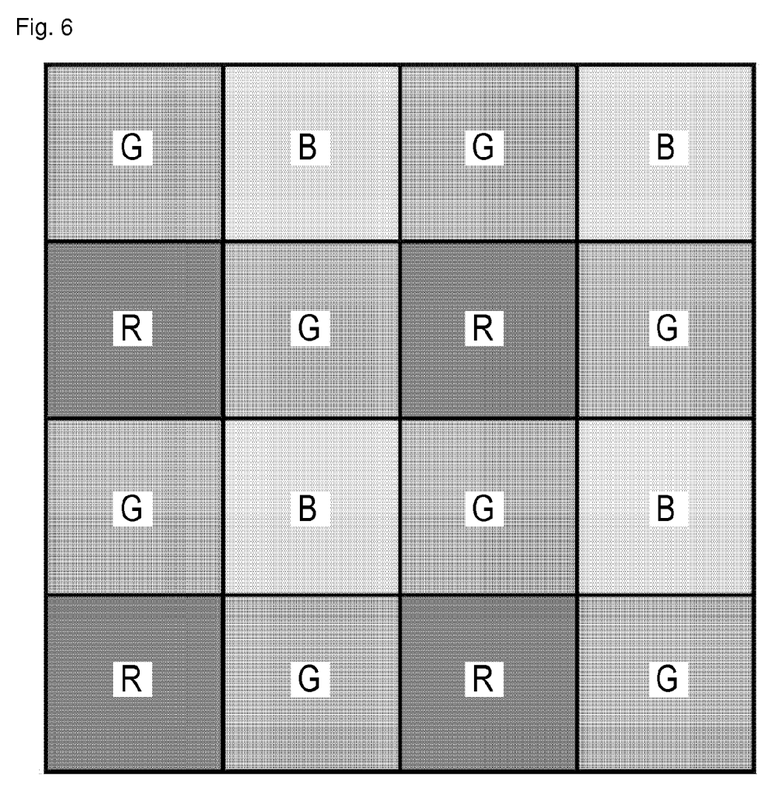
FIG. 6 is an enlarged diagrammatic view of a color filter in the embodiment.

FIG. 6 is an enlarged diagrammatic view of a color filter in the embodiment. In FIG. 6, in each portion labeled with R is disposed a "reflective dichroic filter that transmits red light but reflects light having the other colors." In each portion labeled with G is disposed a "reflective dichroic filter that transmits green light but reflects light having the other colors." In each portion labeled with B is disposed a "reflective dichroic filter that transmits blue light but reflects light having the other colors."

Figure 7:
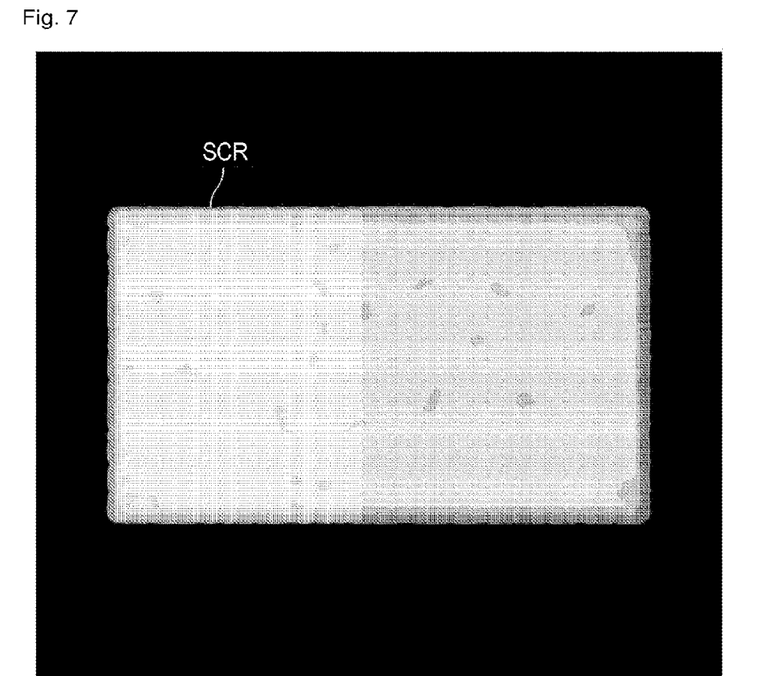
FIG. 7 shows relative light intensity (relative light flux intensity) of light that exits from the projector according to the embodiment.

FIG. 7 shows relative light intensity (relative light flux intensity) of the light that exits from the projector 1000 according to the embodiment.

In the drawings that describe optical systems and optical elements, three directions perpendicular to one another are called a z-axis direction (direction of optical axis 100ax of illuminator 100 in FIG. 1(a) (illumination optical axis)), an x-axis direction (direction parallel to plane of view in FIG. 1(a) and perpendicular to z axis), and a y-axis direction (direction perpendicular to plane of view in FIG. 1(a) and perpendicular to z axis).

In FIG. 4(b), the solid-line graph represents the relative light intensity in a plane parallel to the y and z axes (yz plane), and the broken-line graph represents the relative light intensity in a plane parallel to the x and z axes (xz plane).

The projector 1000 according to the embodiment includes the illuminator 100, the liquid crystal light modulator 200, and a projection system 300, as shown in FIG. 1(a). The projector 1000 projects a full-color image by using red light, green light, and blue light. The projector 1000 is a single-panel projector including the single liquid crystal light modulator 200, which is a transmissive light modulator, as a light modulator.

In the projector 1000, when viewed along at least one of the directions perpendicular to the illumination optical axis 100ax (direction along which FIG. 1(a) is viewed, for example), the optical system ranging from the solid-state light source 24 (which will be described later) to the projection system 300 is arranged along a straight line.

The illuminator 100 includes the light source apparatus 10, the reflector 40, and a polarization conversion element 50. The illuminator 100 outputs illumination light containing red light, green light, and blue light (that is, light that can be used as white light).

The light source apparatus 10 includes the white-light emitting diode 20 and the collimator system 30 and outputs parallelized light.

The white-light emitting diode 20, which is of Lambert's emission type, includes a substrate 22, the solid-state light source 24, the fluorescent layer 26, and a sealing member 28 and emits light containing red light, green light, and blue light. The white-light emitting diode 20 further includes lead wires and other components as well as the components described above, but these other components will not be illustrated or described.

The projector according to the embodiment of the invention may alternatively use a plurality of white-light emitting diodes.

The substrate 22 is a component on which the solid-state light source 24, the fluorescent layer 26, and the sealing member 28, which is transparent to visible light, are mounted. Although not described in detail, the substrate 22 also has a function of relaying supplied electric power to the solid-state light source 24, a function of dissipating heat generated in the solid-state light source 24, and other functions.

The solid-state light source 24 is formed of a light emitting diode that produces blue light (the emitted light intensity peaks at about 460 nm, see FIG. 3(a)) that serves not only as excitation light but also as color light.

The fluorescent layer 26 produces fluorescence from a part of the blue light emitted from the solid-state light source 24. Specifically, fluorescence containing red light (the emitted light intensity peaks at about 610 nm) and green light (the emitted light intensity peaks at about 550 nm) is produced from the part of the blue light (see FIG. 3(b)).

The white-light emitting diode 20 thus emits light containing blue light that is not used in fluorescence generation but passes through the fluorescent layer 26 along with fluorescence (red light and green light) (that is, light that can be used as white light).

The fluorescent layer 26 is formed of a layer containing, for example, a YAG-based phosphor. The fluorescent layer may alternatively contain any other suitable phosphor (such as silicate-based phosphor and TAG-based phosphor). Still alternatively, the fluorescent layer may contain a phosphor that converts excitation light into red light ($CaAlSiN_3$ red phosphor, for example) and a phosphor that converts excitation light into green light (beta-sialon green phosphor, for example).

Since the blue light that is not used in fluorescence generation but passes through the fluorescent layer 26 is scattered in or reflected off the fluorescent layer 26, the white-light emitting diode 20 emits light having a distribution characteristic substantially similar to that of the fluorescence.

The collimator system 30 is an optical element that parallelizes the light from the white-light emitting diode 20 and formed of two collimator lenses (first lens 32 and second lens 34), as shown in FIGS. 1(a) and 4(a). In the collimator system 30, the first lens 32 is a meniscus convex lens having a spherical light-incident surface 31 and a spherical light-exiting surface 33, and the second lens 34 is an aspheric biconvex lens having an aspheric light-incident surface 35 and an aspheric light-exiting surface 36, as shown in FIG. 4(a). The collimator system 30 therefore satisfies a condition that at least one of the surfaces of the at least two collimator lenses is an aspheric surface. The collimator system 30 outputs light having a substantially uniform light flux density distribution, as shown in FIGS. 4(b) and 4(c).

The shapes of the first and second lenses are not limited to those described above, and the number of lenses that form the collimator system may alternatively be one or three or more.

The reflector 40, which is disposed between the light source apparatus 10 and the polarization conversion element 50 as shown in FIG. 1(a), transmits light in the vicinity of the optical axis of the light source apparatus 10 (which coincides with the illumination optical axis 100ax in the projector 1000) and reflects peripheral light apart from the optical axis of the light source apparatus 10 toward the fluorescent layer 26. The reflector 40 has a light transmitting section 42 including the illumination optical axis 100ax and a light reflecting section 44 including reflection mirrors 45, 46, 47, and 48 that surround the light transmitting section 42, as shown in FIG. 5. The reflector 40 is so disposed that it is set apart from the polarization conversion element 50.

The light transmitting section 42 has a rectangular shape having a center that coincides with the illumination optical axis 100ax. The diagonal length L of the rectangular shape ranges from 70% of the effective diameter of the collimator system 30 to 110% thereof, for example, about 85% thereof.

In the embodiment, the rectangular shape is set so that the ratio of the length in the horizontal direction (x-axis direction) to the length in the vertical direction (y-axis direction) is 8:9. It is noted that the shape of the light transmitting section in the invention is not limited to that described above but may be any shape according to the configuration of the projector.

The reflection mirrors 45, 46, 47, and 48 in the light reflecting section 44 are disposed around the illumination optical axis 100ax.

The polarization conversion element 50 converts the light having passed through the light transmitting section 42 of the reflector 40 into a polarized light.

The polarization conversion element 50 has a polarization separation layer that directly transmits one linearly polarized light component contained in the incident light and reflects the other linearly polarized light component in the direction perpendicular to the illumination optical axis 100ax, a reflection layer that reflects the other linearly polarized light component reflected off the polarization separation layer in the direction parallel to the illumination optical axis 100ax, and a wave plate that converts the other linearly polarized light component reflected off the reflection layer into the one linearly polarized light component.

The shape of the light transmitting section 42 is the same as the shape of the area within which the polarization conversion element 50 can convert light.

The one linearly polarized light component that directly passes through the polarization separation layer of the polarization conversion element 50 is incident on the areas R2 and R3 of the image formation area 210, as shown in FIG. 1. On the other hand, the other linearly polarized light component reflected off the polarization separation layer and passing through the wave plate is converted into the one linearly polarized light component and then incident on the area R1 and R4 of the image formation area 210.

Since the polarization conversion element 50 is configured as described above, the horizontal width (width in x-axis direction) of the light flux having passed through the polarization conversion element 50 is twice the horizontal width of the light flux before passing through the polarization conversion element 50, as shown in FIG. 1. Since the light flux passing through the light transmitting section 42 has the horizontal length to vertical length ratio of 8:9, the light flux having passed through the polarization conversion element 50 has the ratio of 16:9.

The liquid crystal light modulator 200 modulates the light from the illuminator 100 in accordance with image information to form a full-color image. The liquid crystal light modulator 200 is disposed immediately downstream of the polarization conversion element 50, as shown in FIG. 1. In the configuration described above, the amount of light loss and the amount of disorder of the polarization direction can be reduced, whereby the light usage efficiency can be further increased.

The liquid crystal light modulator 200 includes a color filter. The color filter has reflective dichroic filters disposed in a Bayer arrangement (see FIG. 6) and serves as a color separation system that separates the light from the illuminator 100 into red light, green light, and blue light on a pixel basis. It is noted that any other suitable color separation system may be used as the color separation system.

The liquid crystal light modulator 200 further includes a light-incident-side polarizer (not shown) interposed between the liquid crystal light modulator and the polarization conversion element 50 and a light-exiting-side polarizer (not shown) interposed between the liquid crystal light modulator and the projection system 300. The light-incident-side polarizer, the liquid crystal light modulator, and the light-exiting-side polarizer modulate incident color light.

The liquid crystal light modulator itself is a transmissive liquid crystal light modulator that encapsulates and seals a liquid crystal material, which is an electro-optic material, between a pair of transparent glass substrates. For example, a polysilicon TFT is used as a switching device to modulate the polarization direction of one type of linearly polarized light incident from the light-incident-side polarizer in accordance with a given image signal.

In the image formation area 210 of the liquid crystal light modulator 200, the ratio of the horizontal length (length in x-axis direction) to the vertical length (length in y-axis direction) is 16:9, as shown in FIG. 1(*b*).

The projection system 300 projects a full-color image outputted from the liquid crystal light modulator 200 and forms a projected image on a screen SCR.

The projector 1000 can project a projection image having a substantially uniform light intensity distribution across a projected area of the screen SCR, as shown in FIG. 7.

Advantageous effects provided by the projector 1000 according to the embodiment will next be described.

The projector 1000 according to the embodiment includes the reflector 40. The reflector 40 is disposed between the light source apparatus 10 and the polarization conversion element 50, transmits light in the vicinity of the optical axis of the light source apparatus 10, and reflects peripheral light apart from the optical axis of the light source apparatus 10 toward the fluorescent layer 26. Therefore, excitation light contained in the peripheral light returns to the fluorescent layer. Consequently, an extra amount of fluorescence can be emitted from the fluorescent layer by irradiation of the excitation light. As a result, the light usage efficiency can be further increased.

Since the projector 1000 according to the embodiment includes the light source apparatus 10, which includes the solid-state light source 24 that produces excitation light and the fluorescent layer 26 that produces fluorescence by irradiation of the excitation light, the projector 1000 can be compact and lightweight and emit high-luminance light considering its size.

In the projector 1000 according to the embodiment, since the reflector 40 has the light transmitting section 42 including the optical axis of the light source apparatus 10 and the light reflecting section 44 including the reflection mirrors 45, 46, 47, and 48 that surround the light transmitting section 42, the peripheral light can be reflected by using a simple configuration.

In the projector 1000 according to the embodiment, since the diagonal length of the rectangular shape ranges from 70% of the effective diameter of the collimator system 30 to 110% thereof, the light in the vicinity of the optical axis will not be reflected, whereas the peripheral light can be sufficiently reflected.

In the projector 1000 according to the embodiment, since the light transmitting section 42 has a rectangular shape having a center that coincides with the optical axis of the illuminator (illumination optical axis 100*ax*), an optical element in a downstream stage can be used in the most effective manner.

In the projector 1000 according to the embodiment, since the collimator system 30 is formed of at least two collimator lenses and at least one of the surfaces thereof is an aspheric surface, the light from the fluorescent layer can be parallelized with precision.

In the projector 1000 according to the embodiment, since the collimator system 30 is formed of at least two collimator lenses and at least one of the surfaces thereof is an aspheric surface, the aspheric surface can adjust the light flux density distribution of the parallelized light.

In the projector 1000 according to the embodiment, since the collimator system 30 outputs light having a substantially uniform light flux density distribution, a light intensity distribution which is sufficiently uniform is provided without an optical integration system or any other similar optical system, whereby the resultant projector can be more compact and lightweight.

Since the projector 1000 according to the embodiment includes a single transmissive light modulator (liquid crystal light modulator 200) as a light modulator, the optical system can be simplified, unlike a case where a reflective light modulator is used or a case where a plurality of light modulators are provided. As a result, the projector can be still more compact and lightweight.

In the projector 1000 according to the embodiment, since the light modulator includes a color filter, a color projection image can be projected by using only one light modulator.

In the projector 1000 according to the embodiment, since the color filter is formed of reflective dichroic filters, color light that is not desired to be transmitted in the color separation process can be reflected, whereby the color light, which may overheat the light modulator, will not be absorbed.

In the projector 1000 according to the embodiment, since the color filter is formed of reflective dichroic filters, apart of the excitation light having reached the color filter can be reflected, whereby the light usage efficiency can be further increased by allowing the reflected excitation light to be incident again on the fluorescent layer.

In the projector 1000 according to the embodiment, since the color filter is formed of color filters disposed in a Bayer arrangement, a projected image can be of apparently high resolution.

In the projector 1000 according to the embodiment, since the color filter is formed of color filters disposed in a Bayer arrangement, the number of dichroic filters that transmit green light and reflect blue light is greater than the number of other color filters, whereby the blue light, which is used as excitation light in many cases, is allowed to be reflected more and return to the fluorescent layer.

In the projector 1000 according to the embodiment, since the optical system ranging from the solid-state light source 24 to the projection system 300 is arranged along a straight line when viewed in at least one of the directions perpendicular to the optical axis of the illuminator 100, the projector can have a simple configuration.

In the projector 1000 according to the embodiment, since the light source apparatus 10 includes the white-light emitting diode 20 including the solid-state light source 24 and the fluorescent layer 26, a reliable, high-luminance, full-color image can be projected.

The invention has been described with reference to the above embodiment but is not limited thereto. The invention can be implemented in a variety of aspects to the extent that they do not depart from the substance of the invention. For example, the following variations fall within the scope of the invention.

(1) The dimension, the number, the material, and the shape of each of the components described in the above embodiment are presented by way of example, and they can be changed to the extent that the advantageous effects of the invention are not compromised.

Figure 8:
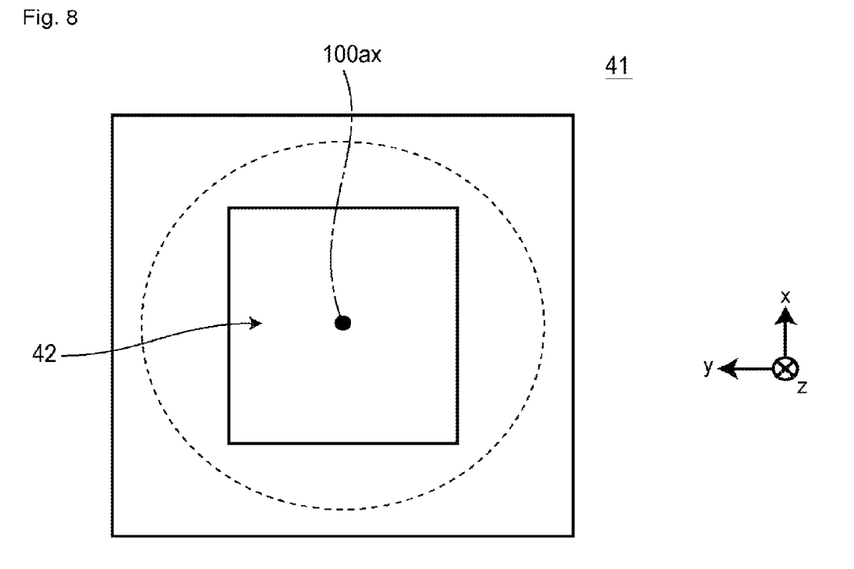
FIG. 8 shows a reflector in a variation viewed from the side where the collimator system is present.

(2) The light reflecting section 44 including the four rectangular reflection mirrors 45, 46, 47, and 48 is used in the embodiment described above, but the invention is not necessarily configured this way. FIG. 8 shows a reflector 41 in a variation viewed from the side where the collimator system 30 is present. For example, a light reflecting section formed of a single reflection mirror having a shape with an internal space (window-frame shape) may be used, as shown in FIG. 8.

(3) The light source apparatus 10 in the embodiment outputs "light that can be used as white light," but the invention is not necessarily configured this way. The light source apparatus may output light other than the "light that can be used as white light" (for example, light containing a large amount of specific color light component).

(4) The solid-state light source 24, which produces blue light having an emitted light intensity peak of about 460 nm, is used in the above embodiment, but the invention is not necessarily configured this way. For example, a solid-state light source that produces blue light having an emitted light intensity peak ranging from 440 to 450 nm may be used. Using such a light source allows fluorescence generation efficiency in a phosphor to be improved.

(5) The solid-state light source 24 formed of a light emitting diode is used as the solid-state light source in the above embodiment, but the invention is not necessarily configured this way. For example, the solid-state light source may be a semiconductor laser.

(6) A transmissive projector is used in the above embodiment, but the invention is not necessarily configured this way. For example, a reflective projector may be used.

(7) The above embodiment has been described with reference to a projector using a single light modulator, but the invention is not necessarily configured this way. The invention is also applicable to a projector using two or more light modulators.

(8) The invention is applicable not only to a front projection projector that projects a projection image from the observation side but also to a rear projection projector that projects a projection image from the side opposite the observation side.

(9) The reflector 40 set apart from the polarization conversion element 50 is used in the above embodiment, but the invention is not necessarily configured this way. A reflector set in contact with the polarization conversion element may be used. Further, reflection mirrors are used as the reflector (light reflecting section) in the above embodiment, but the invention is not necessarily configured this way. For example, a reflection layer may be directly formed on the light-incident surface of the polarization conversion element in an evaporation process, and the reflection layer may be used as the reflector.

The entire disclosure of Japanese Patent Application No. 2011-054022, filed on Mar. 11, 2011 is expressly incorporated by reference herein.

What is claimed is:

1. A projector comprising:
an illuminator including a light source apparatus that includes the following components and outputs parallelized light: a solid-state light source that produces excitation light, a fluorescent layer that produces fluorescence from a part of the excitation light emitted from the solid-state light source, and a collimator system that parallelizes a light from the fluorescent layer;
a light modulator that modulates a light from the illuminator in accordance with image information; and
a projection system that projects a light from the light modulator, wherein the illuminator further includes
a polarization conversion element that converts a light from the light source apparatus into a polarized light, and
a reflector that is disposed between the light source apparatus and the polarization conversion element, transmits light in the vicinity of an optical axis of the light source apparatus, and reflects peripheral light apart from the optical axis of the light source apparatus toward the fluorescent layer,
wherein the collimator system is formed of at least two collimator lenses, and at least one surface among surfaces of the at least two collimator lenses s an aspheric surface.

2. The projector according to claim 1,
wherein the reflector has a light transmitting section including the optical axis of the light source apparatus and a light reflecting section having a reflection mirror that surrounds the light transmitting section.

3. The projector according to claim 2,
wherein the light transmitting section has a rectangular shape,
the rectangular shape has a center that coincides with the optical axis of the illuminator, and
the rectangular shape has a diagonal length ranging from 70% of an effective diameter of the collimator system to 110% thereof.

4. The projector according to claim 1,
wherein the light modulator is a single transmissive light modulator.

5. The projector according to claim 4,
wherein the light modulator has a color filter.

6. The projector according to claim 5,
wherein the color filter is formed of reflective dichroic filters.

7. The projector according to claim 6,
wherein the color filter is formed of color filters disposed in a Bayer arrangement.

8. The projector according to claim 1,
wherein an optical system ranging from the solid-state light source to the projection system is arranged along a straight line when the optical system is viewed in at least one direction among directions perpendicular to the optical axis of the illuminator.

9. The projector according to claim 1,
wherein the light source apparatus includes a white-light emitting diode formed of the solid-state light source and the fluorescent layer.

10. The projector according to claim 1, wherein the collimator system outputs light having a substantially uniform flux density distribution.

11. A projector comprising:
a light source apparatus that includes a solid-state light source, a fluorescent layer that produces fluorescence from part of excitation light emitted from the solid-state light source, and a collimator system that parallelizes light from the fluorescent layer;
a polarization conversion element including a polarization separation layer, a reflection layer, and a wave plate, the polarization conversion element receiving light emitted from the light source apparatus;
a light modulator that modulates light from the polarization conversion element in accordance with image information;
a projection system that projects light from the light modulator; and
a reflector disposed between the light source apparatus and the polarization conversion element, the reflector including a light transmitting section and a light reflection section,
wherein the light transmitting section transmits a first component of the light emitted from the light source apparatus, the first component travelling toward the polarization separation layer, and
wherein the light reflecting section reflects a second component of the light emitted from the light source apparatus, the second component travelling toward an area other than the polarization separation layer.

12. The projector according to claim 11, wherein the collimator system is formed of at least two collimator lenses, and at least one surface among surfaces of the at least two collimator lenses is an aspheric surface.

13. The projector according to claim 11, wherein the collimator system outputs light having a substantially uniform flux density distribution.

14. The projector according to claim 11,
wherein the light modulator is a single transmissive light modulator.

15. The projector according to claim 11,
wherein the light source apparatus includes a white-light emitting diode formed of the solid-state light source and the fluorescent layer.

* * * * *